June 28, 1960  H. KOLLING ET AL  2,943,083
PROCESS FOR CONTINUOUSLY PROCESSING REACTION
PRODUCTS OF THE POLYMERIZATION OF ETHYLENE
Filed Aug. 1, 1956
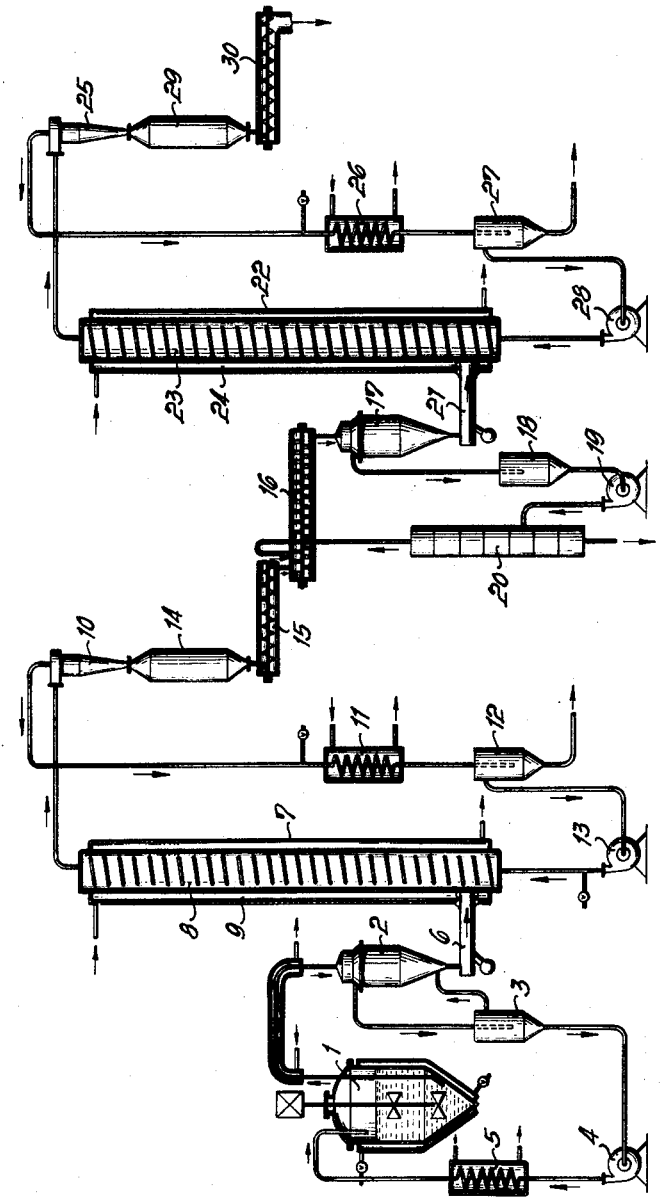

United States Patent Office

2,943,083
Patented June 28, 1960

2,943,083

PROCESS FOR CONTINUOUSLY PROCESSING REACTION PRODUCTS OF THE POLYMERIZATION OF ETHYLENE

Helmut Kolling, Duisburg-Hamborn, Nikolaus Geiser, Oberhausen-Holten, and Wilfried von Hoffmann, Oberhausen-Sterkrade, Germany, assignors to Ruhrchemie Aktiengesellschaft, Oberhausen-Holten, Germany Filed Aug. 1, 1956, Ser. No. 601,584

Claims priority, application Germany Aug. 3, 1955

6 Claims. (Cl. 260—94.9)

The polymerization of olefins, especially that of ethylene, may be effected with catalysts consisting of a mixture of organometallic compounds, especially aluminum alkyl compounds, and metal compounds of the 4th to 6th subgroups of the periodic system, especially titanium compounds, as, for example, titanium tetrachloride. (See Belgian Patents Nos.) 533.362 and 534,792. The polymerization is carried out at relatively low pressures and at temperatures of below about 100° C. The process is generally effected in the presence of an auxiliary liquid, or suspension agent the primary purpose of which is to ensure a sufficiently good agitation of the reaction mixture until the synthesis is completed. Aliphatic, hydroaromatic and aromatic hydrocarbons in the gasoline of diesel oil boiling range are used as the auxiliary liquid. They must be very carefully freed from all oxygen-containing compounds since these seriously interfere with the course of the reaction in the polymerization.

The reaction product from the polymerization of ethylene withdrawn from the reaction vessel comprises polyethylene, auxiliary liquid and residual catalyst. To recover the polyethylene from this reaction mixture, the bulk of the auxiliary liquid is first separated mechanically. This results in a mass which still contains some auxiliary liquid and, moreover, is contaminated with residual catalyst.

It has been suggested to effect the removal of the hydrocarbons and of the residues of catalyst which, after the mechanical separation of the bulk of the auxiliary liquid still adhere to the reaction mass, by a treatment with alcohols having a low number of carbon atoms in the molecule, for example, with water-soluble alcohols. This results in polyethylenes having ash values of below 0.1% or below 0.05% by weight. However, the process exhibits two essential disadvantages. One of these is that relatively large amounts of alcohols are required for removing the residues of the hydrocarbons used as auxiliary liquid. This means that a considerable amount of distillation work is required for recovering the hydrocarbon and the alcohol. Moreover, this distillation problem is relatively difficult due to the fact that the alcohol and the hydrocarbon form azeotropic mixtures. Also, the hydrocarbons must be very carefully freed from the last traces of alcohol before being re-used because, as mentioned above, smallest amounts of oxygen-containing compounds interfere very seriously with the polymerization of ethylene. This purification requires additional equipment and expenses.

It has been found that all these difficulties can be avoided and, moreover, the entire processing of the reaction product can be carried out in a simple manner and in continuous operation by the following steps: first mechanically separate the reaction mixture of the polymerization into auxiliary liquid, which is completely or partially free from polyethylene and is returned into the reaction vessel, and a polyethylene which still contains auxiliary liquid and residual catalyst; then evaporate from this polyethylene the residual auxiliary liquid, or drive the same off with oxygen-free carrier gases, preferably ethylene; third treat this polyethylene, which is now dry, but still contains residual catalyst, in a pulping device with alcohol, preferably $C_1$–$C_4$ alcohol, to remove the residual catalyst; fourth mechanically separate the polyethylene from the alcohol which, in a fractionating unit, is separated into a bottoms fraction containing residual catalyst and distillate fraction comprising pure alcohol which is returned into the pulping device; and finally drive the residues of alcohol out of the polyethylene by evaporation or by means of a carrier gas.

As mentioned above, by "auxiliary liquid" we understand aliphatic, hydroaromatic or aromatic hydrocarbons in the gasoline to diesel oil boiling range; they are a suspending agent, not a solvent for the polyethylenes formed in the reaction.

According to the invention, the first mechanical separation of the auxiliary liquid from the reaction mixture withdrawn from the polymerization reaction may be effected by means of a continuously operating centrifuge, a centrifugal sifter, or a drum filter. Of course, any other continuously operating mechanical filtering device is applicable provided that it is capable of being sufficiently well protected from the admittance of oxygen and moisture which would decompose the catalyst. Thereby, on the one hand, the auxiliary liquid running back into the reactor and, consequently, the course of the polymerization proper would be detrimentally affected and, on the other hand, an extensive removal of ash from the residue by means of alcohol would be prevented. It is advisable to maintain a certain superatmospheric pressure of, for example, ethylene in the filter unit to prevent oxygen and moisture from entering.

For the removal of the residues of auxiliary liquid from the polyethylene, it is suggested to use a pneumatic drying device, preferably one of the type which operates with utilization of the centrifugal force. This mode of operation is connected with the particular advantage of an extremely short residence time without the necessity of particularly high temperatures. This is of great importance with respect to avoiding deterioration of the polyethylene still containing some catalyst. In a drying device of this type, it is preferable to recycle the carrier gas. The hydrocarbons driven out are condensed in a cooler and can be directly returned into the polymerization since they have not been in contact with oxygen-containing compounds, air or moisture. Gases which have been carefully freed from oxygen-containing compounds must be used as the carrier gas. Examples of such gases are purified nitrogen or hydrogen, but preferably the highly purified ethylene which is used in the synthesis proper.

The removal of residues of auxiliary liquid from the polyethylene may also be effected by evaporation in continuously operating drying devices, as, for example, drums; it is preferable to operate under pressure which is somewhat below atmospheric pressure to avoid detrimental overheating.

The treatment with alcohol for the removal of residual catalyst from the polyethylene freed from hydrocarbons may be effected in any continuously operating pulping apparatus. The use of a screw or twin screw has proven particularly advantageous. This screw is preferably provided with paddles which effect both, the transport of the solid material through the screw and an intimate intermixing of the dry mass and the alcohol.

The separation of the bulk of the pulping liquid is again advantageously effected by means of a continuously operating centrifuge, a centrifugal sifter or a drum filter. In these devices the pulp is separated into an alcohol filtrate and a residue which still contains some alcohol.

It may be of advantage under certain circumstances to use two or several pulping and filtering units connected in series instead of one of such units, and passing the alcohol through these units in countercurrent flow relation with the polyethylene. However, as mentioned above, the advantage of the working method according to the invention consists in that, in contrast to the conventional processing of the polymerization products with alcohol, only little alcohol is required in the process of the invention so that one single pulping and filter unit is generally sufficient.

The filtrate running off from the filtering device, in a continuously operating distillation unit, is separated into a distillate fraction comprising pure alcohol which may be returned to the pulping unit, and a bottoms fraction containing the residual catalyst and small amounts of alcohol-soluble, low molecular weight by-products of the ethylene polymerization.

The removal of the last residues of alcohol from the polyethylene which is practically free from catalyst is preferably accomplished, according to the invention, with use of a pneumatic drying device. An apparatus which operates with utilization of the centrifugal force has again proved particularly useful. In this machine, the mixture of solids and gas is moved in spiral paths through a drying tube by means of a warm gas current while heat is simultaneously supplied through the tube wall. Moreover the apparatus may be substantially designed as described above for the removal of residues of auxiliary liquid.

The working method of the invention will now be illustrated by means of the accompanying flow sheet. It should, however, be understood that this flow sheet represents only a particular embodiment of the working method according to the invention and is, therefore, no limitation of the same.

In the flow sheet a polymerization reactor is designated by 1. The polymerization may be effected in various manners, as, for example, in one or several series-connected vessels provided with stirring means. Hydrocarbon fractions in a range of molecular sizes of $C_7$ to $C_9$ are preferably used as auxiliary liquids.

The reaction mixture withdrawn from the reactor 1 and cooled to about 25° C. by the cooling jacket of the discharge pipe is passed into a centrifugal sifter 2 where it is separated into a filtrate, which may still contain small amounts of polyethylene, and a residue. The filtrate is returned into the reactor from a collecting vessel 3 via a preheater 5 by means of a pump 4.

The residue still contains about 50% of auxiliary liquid and the residual catalyst to be removed. By means of a shaking pipe 6, the residue is introduced into a dryer 7. This dryer consists of a drying pipe proper 8, which is provided with a steam-heated jacket 9. The drying of the incoming mass is accomplished in a very short time by utilizing the centrifugal force, and thereafter the mass is precipitated in a cyclone 10. The inert gas being recycled and preferably consisting of ethylene, is cooled in a cooler 11. The hydrocarbon auxiliary liquid thereby is separated in a collecting vessel 12 and can be returned into the process. Recycling of the gases is effected with a fan 13. The reaction product separated in the cyclone and being now free from hydrocarbons, is collected in a vessel 14 and introduced into the pulping unit described below by means of a discharge screw conveyer 15.

The discharge screw conveyer is simultaneously used for conveying the material and as a gas seal. It shuts the ethylene atmosphere of the dryer off against the alcohol atmosphere of the pulping equipment. Particularly advantageous is a twin screw, the threads of which fit closely into each other when running in the same sense of rotation, and which is provided at the solids discharge with a special sealing means, e.g. a spring-mounted sealing cap.

The pulping equipment consists of a screw 16 provided with paddles. The polyethylene introduced is mixed with about 5 times its quantity of alcohol and is slowly moved through the screw. After the passage through the screw, the polyethylene which has thus been intensively stirred up with alcohol, is passed into a centrifugal sifter 17 where it is separated into an alcohol filtrate and a residue which still contains some alcohol. The filtrate is collected in a collecting vessel 18 and, by means of the pump 19, introduced into a continuously operating distillation unit 20, where it is separated into an overhead product comprising pure alcohol, which is passed to the pulping screw, and a residual fraction which may be withdrawn from the bottom of the distillation unit.

The residue obtained in the centrifugal sifter still containing some alcohol, is introduced into the dryer 22 by means of the shaking pipe 21. This dryer, similar to the first dryer, consists of a drying tube proper 23, a steam-heated jacket 24, a cyclone 25, a cooler 26, a collecting receiver 27, a circulating fan 28 and a receiver 29 for the dried polyethylene, which can be withdrawn from this receiver by means of a discharge screw 30.

The polyethylene obtained by the process of the invention has ash values below 0.1%, and generally below 0.05%. The losses of hydrocarbon auxiliary liquid and of alcohol incurred in the processing are extremely low. The process requires relatively small amounts of recycled alcohol since the alcohol, in the process of the invention, is only required for the removal of the residual catalyst. Therefore, the amount of distillation work is much less than in the known process, in which it is an additional function of the alcohol to remove the residues of auxiliary liquid from the reaction mass. Finally, as already mentioned, one of the main advantages consists in that the difficulties in the separation of the alcohol and hydrocarbon are eliminated, and that the hydrocarbon liquid still contained in the reaction mass after the passage through the first filter unit, can be directly returned into the polymerization without any further treatment. Due to the short residence time and the relatively low temperatures used in the removal of the hydrocarbon auxiliary liquid in the pneumatically operating drying unit, decompositions of the catalysts are avoided so that a practically complete removal of ash from the polyethylene is accomplished in the subsequent treatment with alcohol.

In the claims, the expression "mechanically separated" is intended to designate separation by any known continuously operating mechanical separating process including e.g. the use of a centrifuge, a centrifugal sifter, or a drum filter, or other filtering device, provided that it be sufficiently well protected against admission of oxygen or moisture which would decompose the catalyst.

What we claim is:

1. A process for the processing of reaction products of the polymerization of ethylene at temperatures below about 100° C. and pressures below about 100 atmospheres with the use of a catalyst consisting of a mixture of organometallic compounds, and metal compounds of the 4th to 6th subgroups of the periodic system and in the presence of a suspending agent, selected from the group consisting of aliphatic, hydroaromatic and aromatic hydrocarbons of the gasoline to diesel oil boiling range, which comprises effecting the processing in continuous operation in which the reaction mixture from the polymerization is first mechanically separated into said suspending agent which is substantially free from polyethylene and is returned into the reaction vessel, and a polyethylene which still contains some suspending agent and residual catalyst and from which the residues of the suspending agent are eliminated by means of a heated dryer operated in an ethylene atmosphere with utilization of centrifugal force, whereupon the suspending agent is likewise returned into the polymerization without further treatment, whereas the polyethylene dried rapidly and still containing residual catalyst is precipitated in a cyclone arranged in series with the dryer, is treated in a pulping unit with lower molecular alcohols, to remove the residual catalyst, is then mechanically separated from the alcohol and freed from residual alcohol by evaporation, while the separated alcohol, in a fractionating unit, is separated into bottoms fraction containing residual catalyst and an overhead fraction comprising pure alcohol which is returned into the pulping unit.

2. The process according to claim 1, wherein a hydrocarbon fraction of the range of molecular sizes of $C_7$ to $C_9$ is used as the suspending agent.

3. The process according to claim 1, wherein residual amounts of suspending agent are eliminated from the polyethylene contaminated therewith by distillation.

4. The process according to claim 1, wherein residual amounts of suspending agent are eliminated from the polyethylene contaminated therewith by driving them off with a carrier gas free of oxygen.

5. The process according to claim 1, wherein the lower molecular alcohols used for removing residual catalyst are of a chain length $C_1$ to $C_4$.

6. The process according to claim 1, wherein the freeing of polyethylene from residual alcohol is done by means of a carrier gas.

References Cited in the file of this patent

UNITED STATES PATENTS

| | | |
|---|---|---|
| 2,187,877 | Ferris et al. | Jan. 23, 1940 |
| 2,721,189 | Anderson et al. | Oct. 18, 1955 |
| 2,731,452 | Field et al. | Jan. 17, 1956 |
| 2,838,477 | Roelen et al. | June 10, 1958 |
| 2,845,412 | Heyson | July 29, 1958 |

FOREIGN PATENTS

| | | |
|---|---|---|
| 533,362 | Belgium | May 16, 1955 |
| 538,782 | Belgium | Dec. 6, 1955 |
| 534,888 | Belgium | Jan. 31, 1955 |